L. Wallace.
Hay Loader.
Nº 51500. Patented Dec. 12, 1865.

Witnesses. Inventor.
L. Wallace

L. Wallace.
Hay Loader.
№ 51500  Patented Dec. 12, 1865.

Witnesses.

Inventor.
L. Wallace

UNITED STATES PATENT OFFICE.

LORENZO WALLACE, OF LEAVENWORTH CITY, KANSAS.

IMPROVEMENT IN MACHINES FOR RAKING AND BUNCHING HAY.

Specification forming part of Letters Patent No. 51,500, dated December 12, 1865.

*To all whom it may concern:*

Be it known that I, LORENZO WALLACE, of Leavenworth city, in the county of Leavenworth and State of Kansas, have invented a new and Improved Machine for Raking and Stacking Hay; and I do hereby declare that the following is a full, clear, and exact description thereof, which will enable others skilled in the art to make and use the same, reference being had to the accompanying drawings, forming part of this specification, in which—

Figure 1:
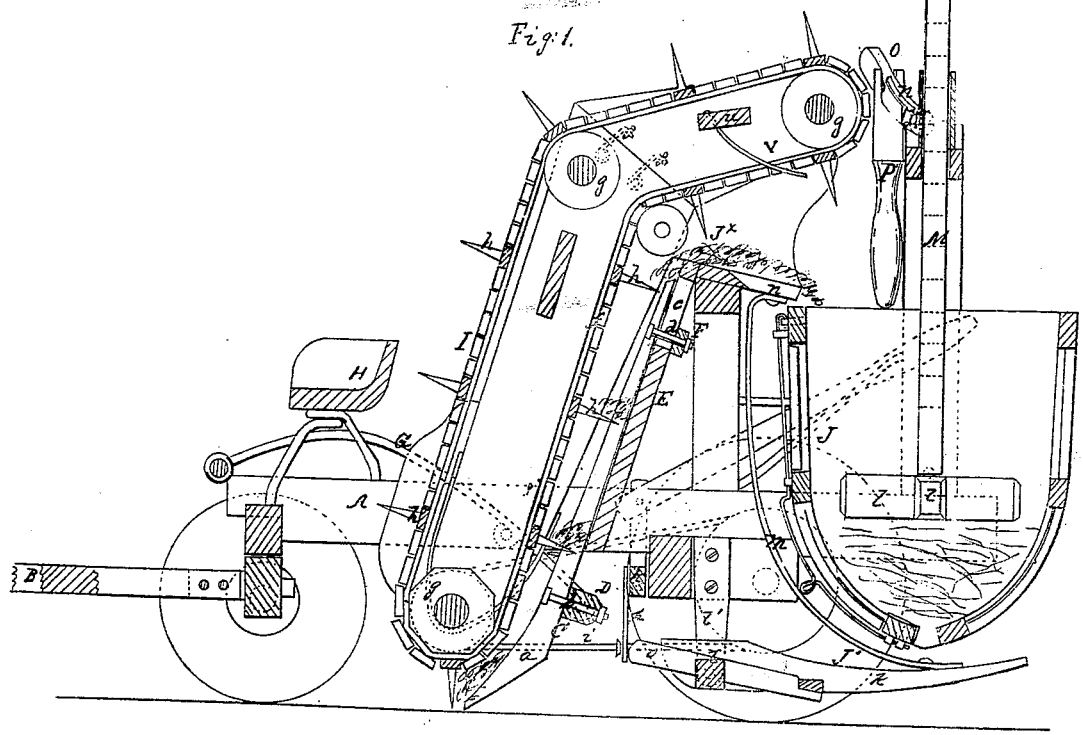
Figure 2:
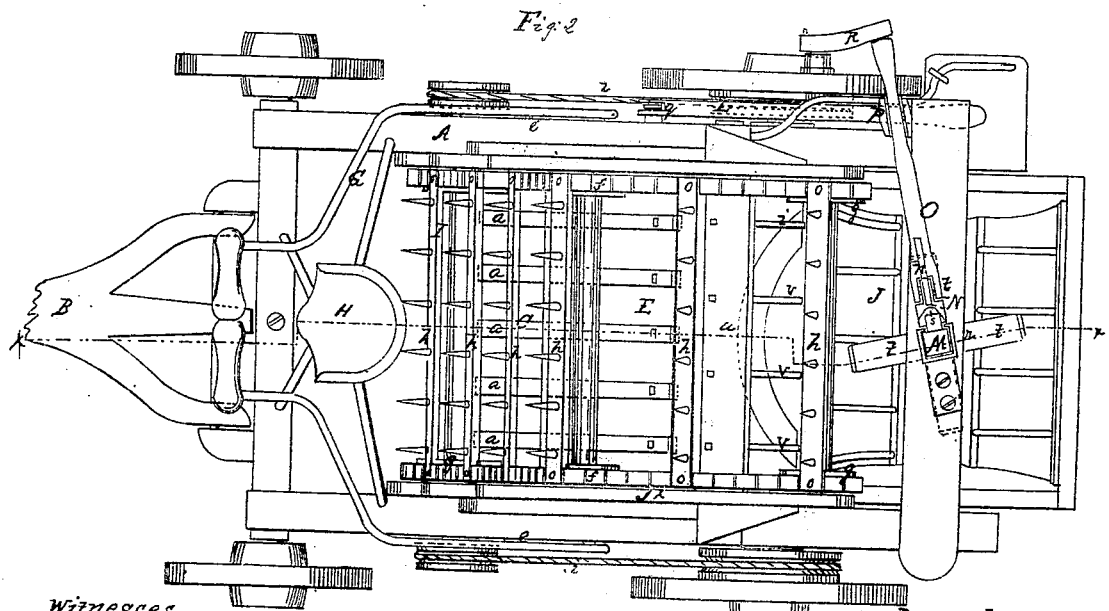
Figure 3:
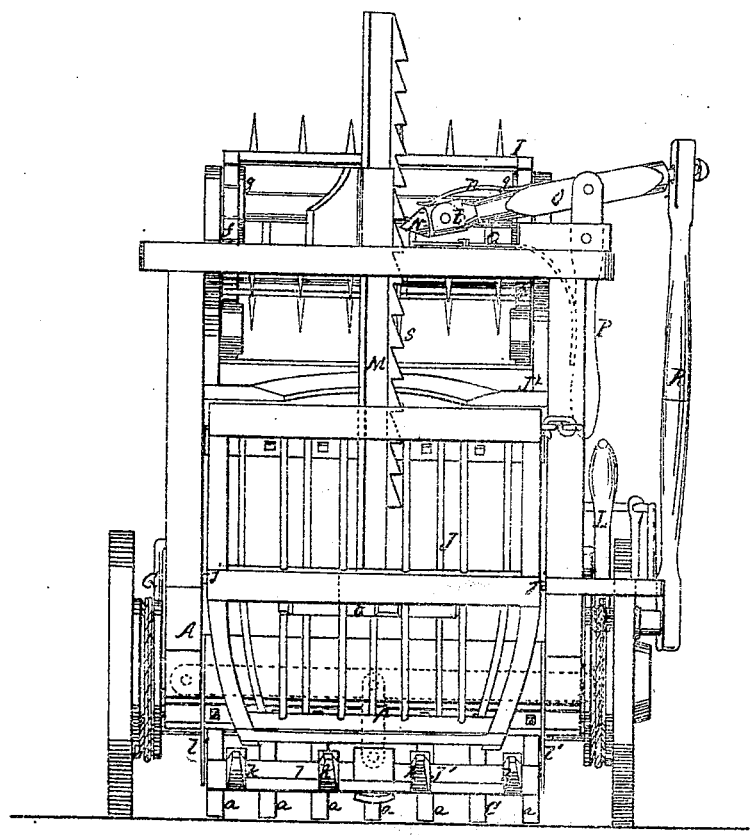

Figure 1, Sheet No. 1, is a side sectional view of my invention, taken in the line $x\ x$, Fig. 2. Fig. 2 is a plan or top view of the same, and Fig. 3, Sheet No. 2, a rear elevation of the same.

Similar letters of reference indicate corresponding parts.

This invention relates to a new and improved machine for raking up and stacking hay in the field, and is designed to economize in the labor of harvesting hay.

The invention consists in the employment or use of an adjustable rake, endless elevating-apron, a receiver provided with a beater, and a discharger, all applied to a mounted frame, and arranged to operate in the manner substantially as hereinafter shown and described.

A represents a frame, which is mounted on wheels, the front ones of which have their axle working on a king-bolt, as usual, the draft-pole B being attached centrally to the front axle.

C represents a rake composed of teeth $a$, which are each secured by a bolt, $b$, to a head, D. The teeth $a$ extend upward and bear against an inclined bed, E, attached to the frame A, said bed having a series of vertical slots, $c$, made in its upper end, through which and the upper parts of the teeth $a$ bolts $d$ pass, with a detached bar, F, at the rear side of bed E. These slots, bolts, and bar serve as a guide for the rake-teeth.

The ends of the rake-head D are attached to a lever-frame, G, the fulcra $e\ e$ of which are at the sides of the frame A, said lever-frame extending to the front part of the frame A and in front of the driver's seat H. By adjusting this lever-frame G the rake-teeth $a$ may be raised and lowered as desired, and the rake, in consequence of being arranged as shown, is allowed to adjust itself to the inequalities of surface over which it may pass.

I represents an endless elevating-apron, composed of belts $f$, which pass around pulleys $g$, (see Fig. 1,) and have rakes $h$ attached to them, (cross-bars provided with teeth.) The pulleys $g$ are so arranged or placed in an upright box, $J^\times$, on the frame A that the apron I will have a slight inclined position from a vertical plane at its lower part and slightly inclined from a horizontal plane at its upper part.

The teeth of the rakes $h$ pass up quite close to the inclined bed E, and said teeth, as they pass around the lower pulleys, $g$, work over the points of the teeth $a$ of rake C, so as to gather the hay raked up by C, and carry it upward to the top of the inclined bed E, over which it is discharged into a receiver, J.

The endless elevating-apron I is operated, as the machine is drawn along, from the rear wheels of the frame A, through the medium of belts $i$, which pass around pulleys attached concentrically to the inner sides of the rear wheels and around pulleys on the shaft of the lower pulleys, $g$, of the apron I.

The receiver J is suspended or hung upon pivots $j\ j$, so that it may be readily inverted when necessary. This receiver may have solid or close ends with slatted or wire sides, one of which is hinged at one end so that it may open and close like a door.

Underneath the receiver J there is what I term a "discharger," J', the same being constructed very similar to a rake, it being composed of teeth K attached to a head, $l$, the ends of which are pivoted in the lower parts of pendent bars $l'\ l'$ attached to the frame A. The teeth $k$ have straps $m$, of leather or other suitable material, attached to them, said straps extending upward and being attached to a board or strip, $n$, at the upper end of the inclined bed E, as shown in Fig. 1.

The head $l$ of the discharger has an arm, $o$, projecting from it at right angles, said arm $o$ being connected by a link, $p$, with a lever, K, in the lower part of the frame A, the outer end of lever K being connected by a link, $g$, with a lever, L, at one side of the machine. By actuating this lever L the discharger may be raised or lowered as desired.

M represents a vertical bar, which passes through a guide, r, and has a rack, s, at one side, with which a pawl, N, engages, said pawl being connected to a lever, O, by a pivot, t, and having a spring, u, bearing upon it. The lever O has its fulcrum-pin in the upper end of a lever, P, attached to the frame of the machine, and said lever P has a slide, Q, connected to it, which, by moving the lever P in one direction, is made to engage with the rack s of the bar M and hold up said bar, the pawl N being drawn out free from the rack s simultaneously with the movement of the slide Q thereto. The lower end of the bar M has cross-bars t t attached to it, which are arranged in such a manner as to turn freely on a pin at the bottom of said bar, and the outer end of the lever O is connected by a rod, R, with one of the rear wheels of the machine, at a suitable distance from the center or axle of the same.

The operation of the machine is as follows: As the device is drawn along the hay is raked up by the teeth of the rake C, and is caught and taken up by the rakes h of the endless elevating-apron I, and discharged into the receiver J. As this receiver gradually fills the hay is compacted therein by the cross-bars t t, which are raised by the action of the lever O and pawl N, the latter engaging with the rack s, and said lever being operated by the connecting-rod, which is driven from one of the wheels of the machine, the bars t t falling by their own gravity each time the pawl N leaves the rack s. Each time the bar M rises the cross-bars t t will turn, more or less, by the hay falling upon them, and will have a tendency to spread or scatter the hay in J. When the receiver J becomes filled it is inverted, the bar M being held up by the slide Q, and the pawl N being drawn from the bar. This may be readily done, in consequence of the receiver being suspended on pivots, and the door or hinged side of the receiver is opened and the discharger J' lowered, and the contents of J will be deposited on the ground in the form of a stack.

The straps m prevent the hay from falling out of the receiver when the latter is turned.

In the upper part of the box $J^\times$ there is placed a horizontal bar, u, having springs v attached to it, which serve as clearers to strip the hay from the teeth of the rakes h of the elevating-apron I.

The device may be constructed at a reasonable cost, and in a very compact manner.

Having thus described my invention, I claim as new and desire to secure by Letters Patent—

1. The rake C, in connection with the endless elevating-apron I and clearers u, placed or arranged in a mounted frame, substantially as and for the purpose set forth.

2. The receiver J, suspended or hung upon pivots, when used in connection with the rake C and elevating-apron I, substantially as and for the purpose specified.

3. The arranging of the rake C in the manner shown and connecting it with a lever-frame, G, substantially as and for the purpose set forth.

4. The beating device composed of the bar M, provided at one side with a rack, s, and having the cross-bars t t at its lower end, in connection with the frame N and slide Q, attached to lever O, and operated from one of the supporting-wheels of the machine, substantially as and for the purpose specified.

5. The discharger J', applied to the machine underneath the receiver J, having straps m attached, connected with levers, and arranged so as to operate in connection with the receiver, substantially as and for the purpose set forth.

LORENZO WALLACE.

Witnesses:
 WILLIAM G. KASE,
 EMIL JACOBS.